US012693620B2

(12) United States Patent
Hori et al.

(10) Patent No.: US 12,693,620 B2
(45) Date of Patent: Jul. 28, 2026

(54) CONVEYING NOZZLE WITH PIVOT JOINT

(71) Applicant: Hewlett-Packard Development Company, L.P., Spring, TX (US)

(72) Inventors: Satoru Hori, Yokohama (JP); Kensuke Nakajima, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 276 days.

(21) Appl. No.: 18/703,999

(22) PCT Filed: May 6, 2022

(86) PCT No.: PCT/US2022/072158
§ 371 (c)(1),
(2) Date: Apr. 23, 2024

(87) PCT Pub. No.: WO2023/076751
PCT Pub. Date: May 4, 2023

(65) Prior Publication Data

US 2026/0153832 A1 Jun. 4, 2026

(30) Foreign Application Priority Data

Oct. 29, 2021 (JP) ................................ 2021-177502

(51) Int. Cl.
*G03G 15/16* (2006.01)
*G03G 21/10* (2006.01)
*G03G 21/12* (2006.01)
*G03G 21/16* (2006.01)

(52) U.S. Cl.
CPC ........... *G03G 21/12* (2013.01); *G03G 15/161* (2013.01); *G03G 21/105* (2013.01); *G03G 21/1647* (2013.01)

(58) Field of Classification Search
USPC .......................................................... 399/101
See application file for complete search history.

(56) References Cited

U.S. PATENT DOCUMENTS 9,134,686 B2 * 9/2015 Yoshikawa .......... G03G 15/161
2005/0008416 A1 1/2005 Serizawa et al.
2011/0142494 A1 6/2011 Oda
2012/0213568 A1 8/2012 Yamamoto et al.
2018/0373197 A1 * 12/2018 Sato .................. G03G 21/1814

FOREIGN PATENT DOCUMENTS

EP 1927898 A2 6/2008
JP 2006-113137 A 4/2006
WO 2021/040782 A1 3/2021

* cited by examiner

*Primary Examiner* — Quana Grainger
(74) *Attorney, Agent, or Firm* — Foley & Lardner LLP

(57) ABSTRACT

An image forming apparatus includes a housing to accommodate toner, a conveying nozzle having an inlet to receive the toner from the housing and an outlet to discharge the toner, and a bracket to couple the inlet of the conveying nozzle with an opening of the housing. The bracket forms a pivot joint disposed adjacent to the inlet to impart a rotational movement of the conveying nozzle around the pivot joint.

13 Claims, 15 Drawing Sheets

CONVEYING NOZZLE WITH PIVOT JOINT

CROSS-REFERENCE TO RELATED APPLICATIONS

This application is a National Stage Application under 35 U.S.C. § 371 of PCT/US2022/072158, filed May 6, 2022, which claims priority to Japanese Patent Application No. 2021-177502, filed Oct. 29, 2021, which are hereby incorporated by reference in their entireties.

BACKGROUND

An image forming apparatus includes a transfer device to convey and transfer a toner image on to a print medium. The transfer device includes an intermediate transfer belt, a tension roller to tension the intermediate transfer belt, a drive roller to rotationally drive the intermediate transfer belt, a primary transfer roller to primarily transfer a toner image on to the intermediate transfer belt, and a secondary transfer roller to secondarily transfer the toner image carried on the intermediate transfer belt, to a print medium. Untransferred toner that remains on the intermediate transfer belt without having been transferred from the intermediate transfer belt to the print medium, is collected by a cleaning device. The toner collected from the intermediate transfer belt is collected in a toner bottle as waste toner or recycled toner.

DETAILED DESCRIPTION

Figure 1:
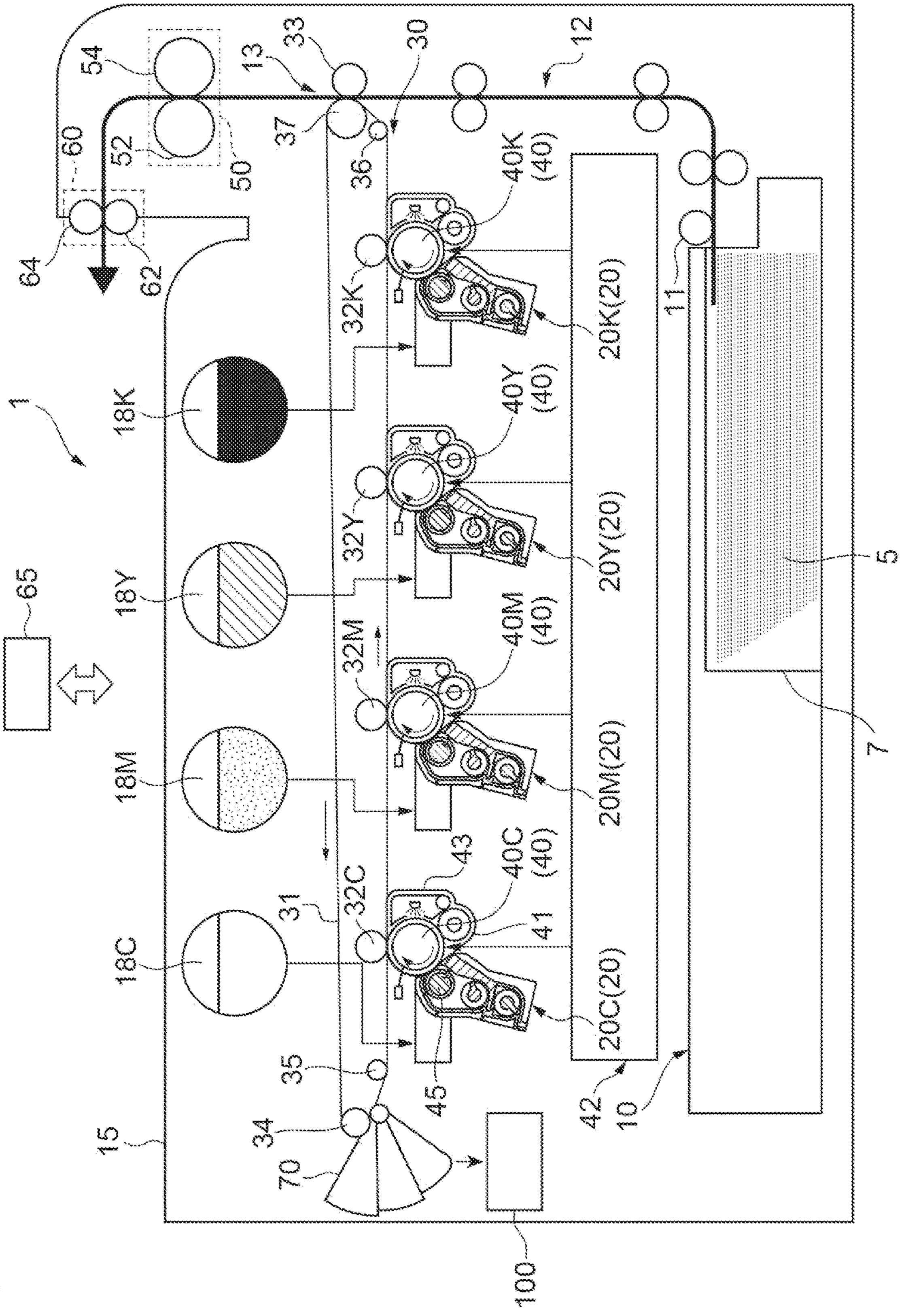
FIG. 1 is a schematic view of an example image forming apparatus.

In the following description, with reference to the drawings, the same reference numbers are assigned to the same components or to similar components having the same function, and overlapping description is omitted. The depiction of the drawings may be partially simplified or exaggerated for the ease of understanding, and dimensional ratios, angles and the like are not limited to those described in the drawings.

An image forming apparatus according to the present disclosure may be, for example, a printer or the like. The example image forming apparatus may include a first container to accommodate toner, and a toner conveying device to convey the toner from the first container to a second container. The toner conveying device includes a conveying nozzle having an inlet to receive the toner from the first container, and an outlet to discharge the toner to the second container. The conveying nozzle may be rotatable around a pivot joint along at least one plane that intersects the pivot joint.

An example image forming apparatus 1 will be described with reference to FIG. 1. The example image forming apparatus 1 may use toner in the four colors of cyan, magenta, yellow, and black to form a color image. The image forming apparatus 1 includes a conveyor 10 to convey a sheet 5 that is a print medium, a plurality of developing devices 20C, 20M, 20Y, and 20K to develop electrostatic latent images into respective toner images of the four colors, a plurality of photoconductors 40C, 40M, 40Y, and 40K having respective surfaces to form the electrostatic latent images, a transfer device 30 on which the toner images of the four colors are layered and which secondarily transfers the layered toner images (or composite toner image) to the sheet 5, a fixing device 50 to fix the layered toner images to the sheet 5, a discharge device 60 to discharge the sheet 5, a cleaning device 70 to collect untransferred toner (or residual toner) remaining on the transfer device 30 after the secondary transfer, and a toner bottle 100 to collect the toner collected, as waste toner or recycled toner. The conveyor 10, the developing devices 20C, 20M, 20Y, and 20K, the transfer device 30, the photoconductors 40C, 40M, 40Y, and 40K, the fixing device 50, the discharge device 60, the cleaning device 70, and the toner bottle 100 are accommodated in a casing 15 of the image forming apparatus 1. The developing devices 20C, 20M, 20Y, and 20K have similar configurations and any one thereof may be referred to herein as a developing device 20. Similarly, the photoconductors 40C, 40M, 40Y, and 40K have similar configurations and any one thereof may be referred to herein as a photoconductor 40.

The conveyor 10 conveys the sheet (e.g., a paper sheet) 5 that is a print medium on to which an image is to be formed, along a conveyance path 12. A plurality of the sheets 5 are initially accommodated in a cassette 7 in a stack of the sheets 5, from which a sheet feeding roller 11 picks up and conveys one of the sheets 5. The conveyor 10 conveys the sheet 5 to reach a transfer region 13 via the conveyance path 12, at a timing at which the layered toner images reach the transfer region 13.

Four developing devices 20C, 20M, 20Y, and 20K are provided for the respective colors of cyan toner, magenta toner, yellow toner and black toner. Each of the developing devices 20C, 20M, 20Y, and 20K includes a developing roller 45 to carry toner to the adjacent one of the photoconductors 40C, 40M, 40Y, and 40K. In each developing device 20, a two-component developer containing toner and carriers is used as a developer. Namely, in the developing device 20, the developer is prepared such that the toner and the carriers are adjusted to a targeted mixing ratio, and are additionally mixed and stirred to disperse the toner and to impart a targeted charge amount to the developer. The developer is carried on the developing roller 45. A rotation of the developing roller 45 conveys the developer to a developing region that faces the photoconductor 40, where the toner contained in the developer is transferred to the electrostatic latent image formed on a circumferential surface of the adjacent photoconductor 40, to form the corresponding toner image. Accordingly, the toner images of the respective colors are formed on the photoconductors 40C, 40M, 40Y, and 40K.

The transfer device 30 conveys the toner images to the transfer region 13 to secondarily transfer the toner images onto the sheet 5. The transfer device 30 includes an intermediate transfer belt 31 that may be an endless belt on to which the toner images are primarily transferred from the respective photoconductors 40C, 40M, 40Y, and 40K in a layered manner, a tension roller 34 to tension the intermediate transfer belt 31, idler rollers 35 and 36, a drive roller 37 to drive the intermediate transfer belt 31, primary transfer rollers 32C, 32M, 32Y, and 32K that interpose the intermediate transfer belt 31 between the primary transfer rollers 32C, 32M, 32Y, and 32K and the respective photoconductors 40C, 40M, 40Y, and 40K, and a secondary transfer roller 33 that interposes the intermediate transfer belt 31 between the secondary transfer roller 33 and the drive roller 37.

The photoconductors 40C, 40M, 40Y, and 40K may also be referred to as electrostatic latent image carriers, photosensitive drums, or the like. Four photoconductors 40C, 40M, 40Y, and 40K are provided for the respective four colors, and are arranged along a movement direction of the intermediate transfer belt 31. The developing device 20, a charging device 41, an exposure unit (or exposure device) 42, and a cleaning device 43 are provided in the vicinity of the photoconductor 40.

The charging device 41 is, for example, a charging roller that contacts the photoconductor 40 to charge the surface of the photoconductor 40 to a predetermined potential. The exposure unit 42 exposes the surface of the photoconductor 40 having been charged by the charging device 41, to a light according to an image to be formed on the sheet 5. Accordingly, the potential of a portion of the surface of the photoconductor 40 that has been exposed to the light of the exposure unit 42 is changed, so that the corresponding electrostatic latent image is formed. The developing devices 20C, 20M, 20Y, and 20K develop the respective electrostatic latent images formed on the photoconductors 40C, 40M, 40Y, and 40K, with the toners supplied from respective toner tanks 18C, 18M, 18Y, and 18K positioned adjacent the respective developing devices 20C, 20M, 20Y, and 20K, so as to form the respective toner images. The toner tanks 18C, 18M, 18Y, and 18K are filled with cyan, magenta, yellow, and black toners, respectively. The toner tanks 18C, 18M, 18Y, and 18K have similar configurations and any one thereof may be referred to herein as a toner tank 18. The cleaning device 43 collects residual toner that remains on the photoconductor 40 after the toner images formed on the photoconductor 40 are primarily transferred onto the intermediate transfer belt 31.

After the layered toner images have been secondarily transferred onto the sheet 5, the fixing device 50 causes the layered toner images to adhere and be fixed to the sheet 5 by conveying the sheet 5 to pass through a fixing nip region where the sheet 5 is heated and pressed. The fixing device 50 includes a heating roller 52 to heat the sheet 5, and a pressure roller 54 that is rotationally driven while pressing the sheet 5 against the heating roller 52. The heating roller 52 and the pressure roller 54 are formed in a cylindrical shape, and the heating roller 52 includes a heat source therein, such as a halogen lamp. The fixing nip region is a contact region provided between the heating roller 52 and the pressure roller 54, through which the sheet 5 passes in order to melt the layered toner images and to fix the layered toner images to the sheet 5, as a fixed toner image.

The discharge device 60 includes discharge rollers 62 and 64 to discharge the sheet 5 including the fixed toner image, to the outside of the image forming apparatus 1.

The image forming apparatus 1 further includes a controller 65. The controller 65 may be a computer including a processor, a storage unit (or storage device), an input device, a display device, and the like, to control an operation of the image forming apparatus 1. The storage unit of the controller 65 may store a control program to be executed by the processor in order to control various operations to be carried out by the image forming apparatus 1.

The cleaning device 70 is provided adjacent to the intermediate transfer belt 31 to collect untransferred toner (or residual toner) that remains on the intermediate transfer belt 31 after the secondary transfer, without having been transferred onto the sheet 5. The toner collected by the cleaning device 70 is conveyed to the toner bottle 100 via a toner conveying device 80 which is described further below. The toner bottle 100 is a container to accommodate the toner collected by the cleaning device 70.

Figure 2:
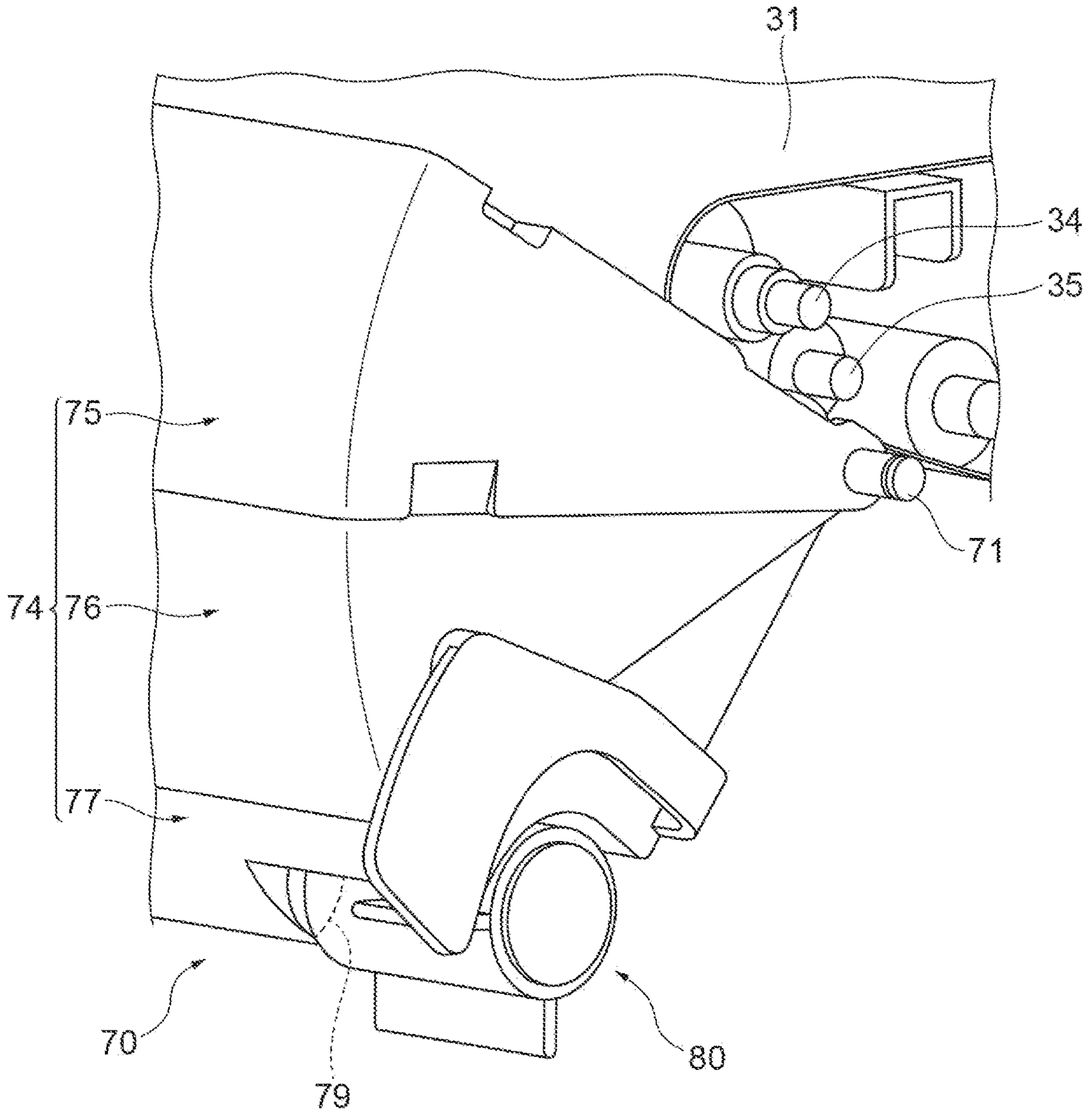
FIG. 2 is a schematic partial perspective view of an example cleaning device shown adjacent an intermediate transfer belt.
Figure 3:
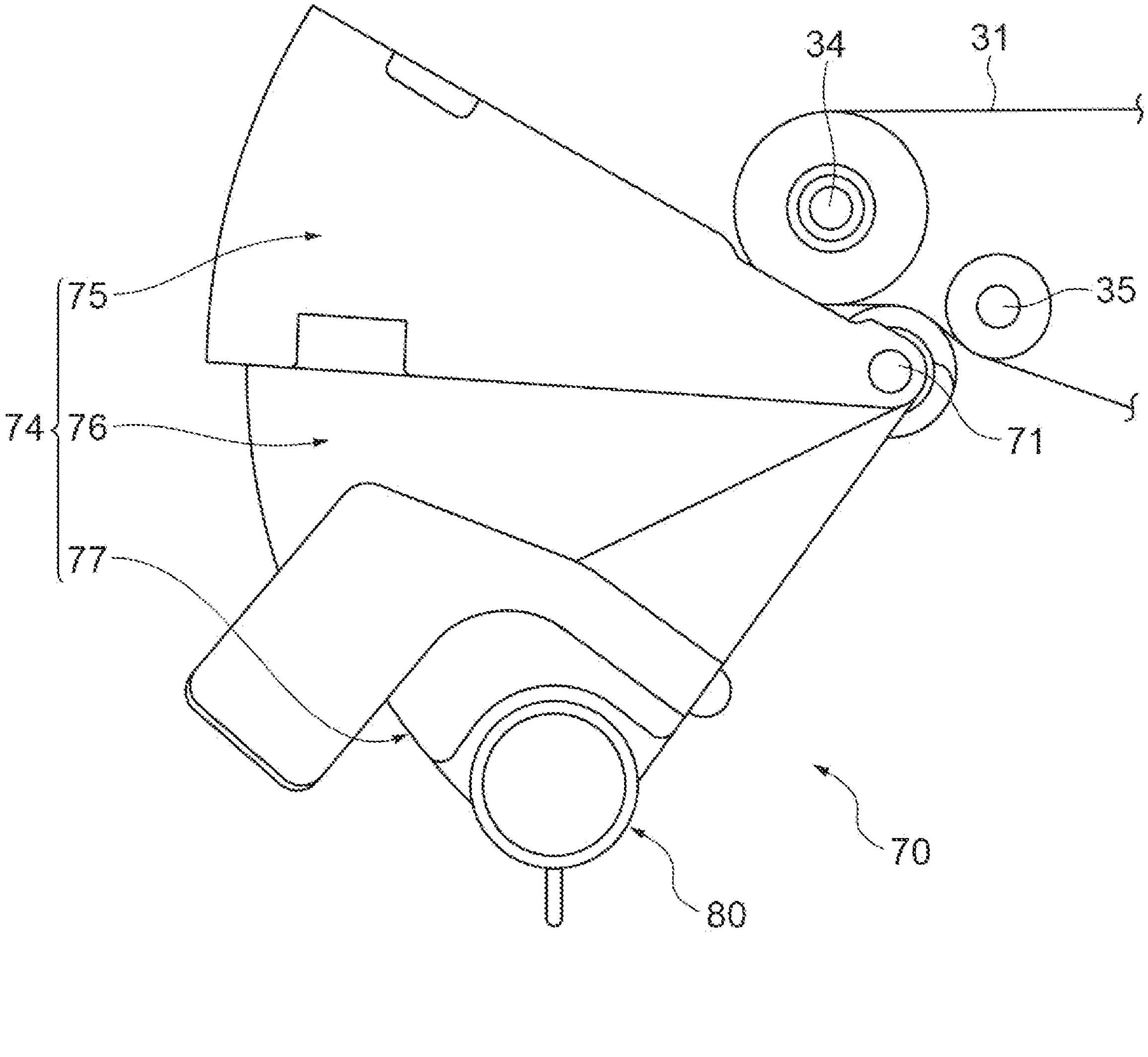
FIG. 3 is a side view of the cleaning device.
Figure 4:
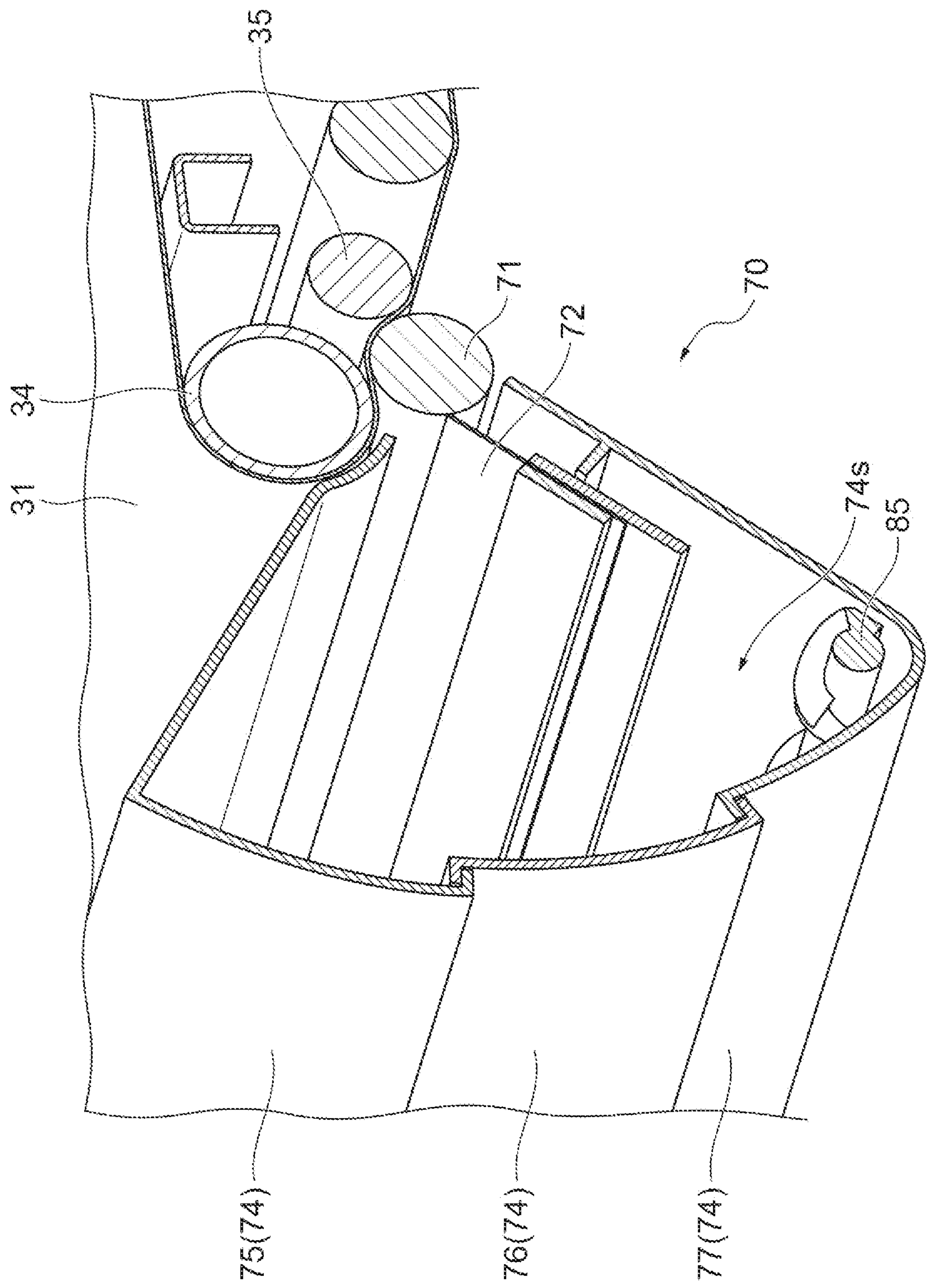
FIG. 4 is a partial cutout perspective view of the cleaning device.

With reference to FIGS. 2 to 4, the example of the cleaning device 70 includes cleaning roller 71, a blade 72, and a housing 74. The cleaning roller 71 is disposed between the tension roller 34 and the idler roller 35, and extends parallel to the tension roller 34. The cleaning roller 71 is a substantially cylindrical roller made of, for example, a rigid material such as metal.

An outer circumferential surface of the cleaning roller 71 contacts a surface of the intermediate transfer belt 31. The cleaning roller 71 receives power from an electric motor to rotate around a rotation axis in a state where the cleaning roller 71 is pressed against the surface of the intermediate transfer belt 31. The cleaning roller 71 rotates in the same direction as or in a direction opposite the movement direction of the intermediate transfer belt 31. The cleaning roller 71 is charged during image formation by receiving a bias electric power, whereby an electrostatic force causes the outer circumferential surface of the cleaning roller 71 to adsorb and collect the residual toner that remains on the intermediate transfer belt 31. Opposite ends of the cleaning roller 71 are rotatably supported by a support body that also supports opposite ends of the tension roller 34. Accordingly, the cleaning device 70 is coupled with the transfer device 30 via the cleaning roller 71.

The blade 72 is a scraper that may be made of, for example, an elastic material such as metal or resin. For example, the blade 72 may be a thin stainless steel plate extending in a width direction of the intermediate transfer belt 31. The blade 72 is disposed in the housing 74, and contacts the outer circumferential surface of the cleaning roller 71 to scrape the toner adhered to the cleaning roller 71. The toner that is separated from the cleaning roller 71 by being scraped by the blade 72, is collected into the housing 74.

The housing 74 is a container to accommodate the toner collected from the intermediate transfer belt 31, and defines a collection chamber 74*s* therein (cf. FIG. 4). The housing 74 includes a fixed portion 75, a first rotatable portion 76, and a second rotatable portion 77. The fixed portion 75 forms an upper portion of the housing 74, and is not rotatable relative to the cleaning roller 71. The first rotatable portion 76 forms an intermediate portion of the housing 74, and is rotatable around a center axis of the cleaning roller 71. The second rotatable portion 77 forms a lower portion of the housing 74, and is rotatable around the center axis of the cleaning roller 71.

The first rotatable portion 76 has an outer shape that is smaller than an outer shape of the fixed portion 75, so that when the first rotatable portion 76 rotates around the cleaning roller 71 toward the fixed portion 75, the first rotatable portion 76 retracts into the fixed portion 75. Similarly, the second rotatable portion 77 has an outer shape that is smaller than the outer shape of the first rotatable portion 76, so that when the second rotatable portion 77 rotates around the cleaning roller 71 toward the fixed portion 75, the second rotatable portion 77 retracts into the first rotatable portion 76.

As described above, the housing 74 is operable between a deployed state and a folded state by a rotation of the first rotatable portion 76 and the second rotatable portion 77 around the cleaning roller 71. When the housing 74 is brought into a folded state, the first rotatable portion 76 and the second rotatable portion 77 are accommodated at least in part inside the fixed portion 75, and the size of the housing 74 is reduced. The housing 74 is folded when the transfer device 30 is pulled out from the casing 15 of the image forming apparatus, for example, for maintenance of the image forming apparatus 1.

On the other hand, when the first rotatable portion 76 and the second rotatable portion 77 rotate around the cleaning roller 71 in a direction away from the fixed portion 75 by gravitational force (e.g., due to their weight), the housing 74 is brought into a deployed state. As a result, the size of the housing 74 is increased, so as to increase the volume of the collection chamber 74*s* of the housing 74. During operation of the image forming apparatus 1, the housing 74 is used in a deployed state.

An opening 79 is formed in the housing 74, to discharge the collected toner from the collection chamber 74*s*. In the example illustrated in FIG. 2, the opening 79 is formed in a wall surface 78 of the second rotatable portion 77 of the housing 74. The wall surface 78 is a flat surface that forms a side surface of the housing 74. The toner in the housing 74 is discharged from the opening 79 to the outside of the housing 74 via the toner conveying device 80 which is described further below.

The toner conveying device 80 is connected to the housing 74. In the example image forming apparatus 1, the toner conveying device 80 is disposed between the housing 74 and the toner bottle 100. The toner conveying device 80 conveys the toner having been collected from the intermediate transfer belt 31, from the housing 74 to the toner bottle 100.

Figure 5:
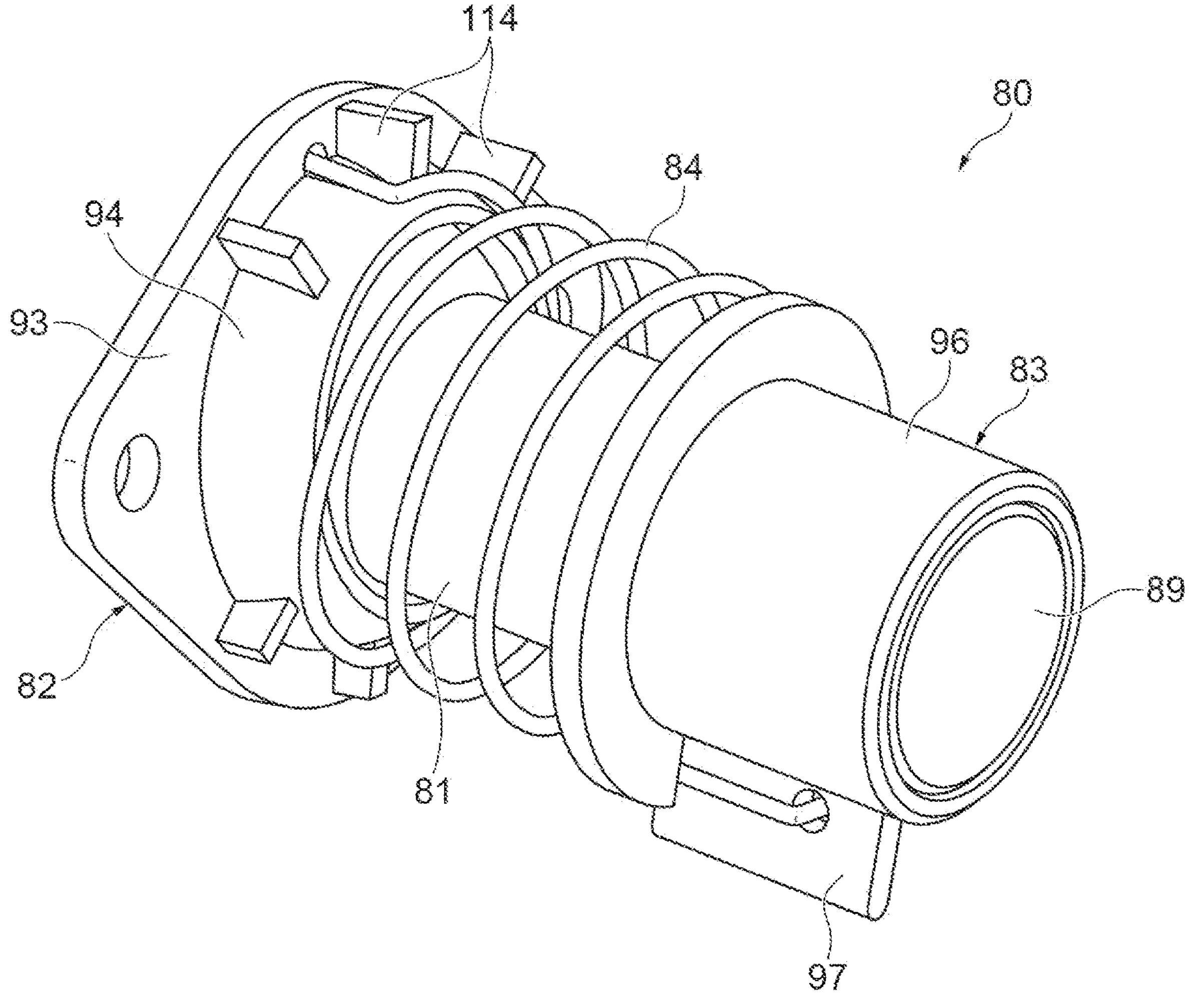
FIG. 5 is a perspective view of an example toner conveying device.
Figure 6:
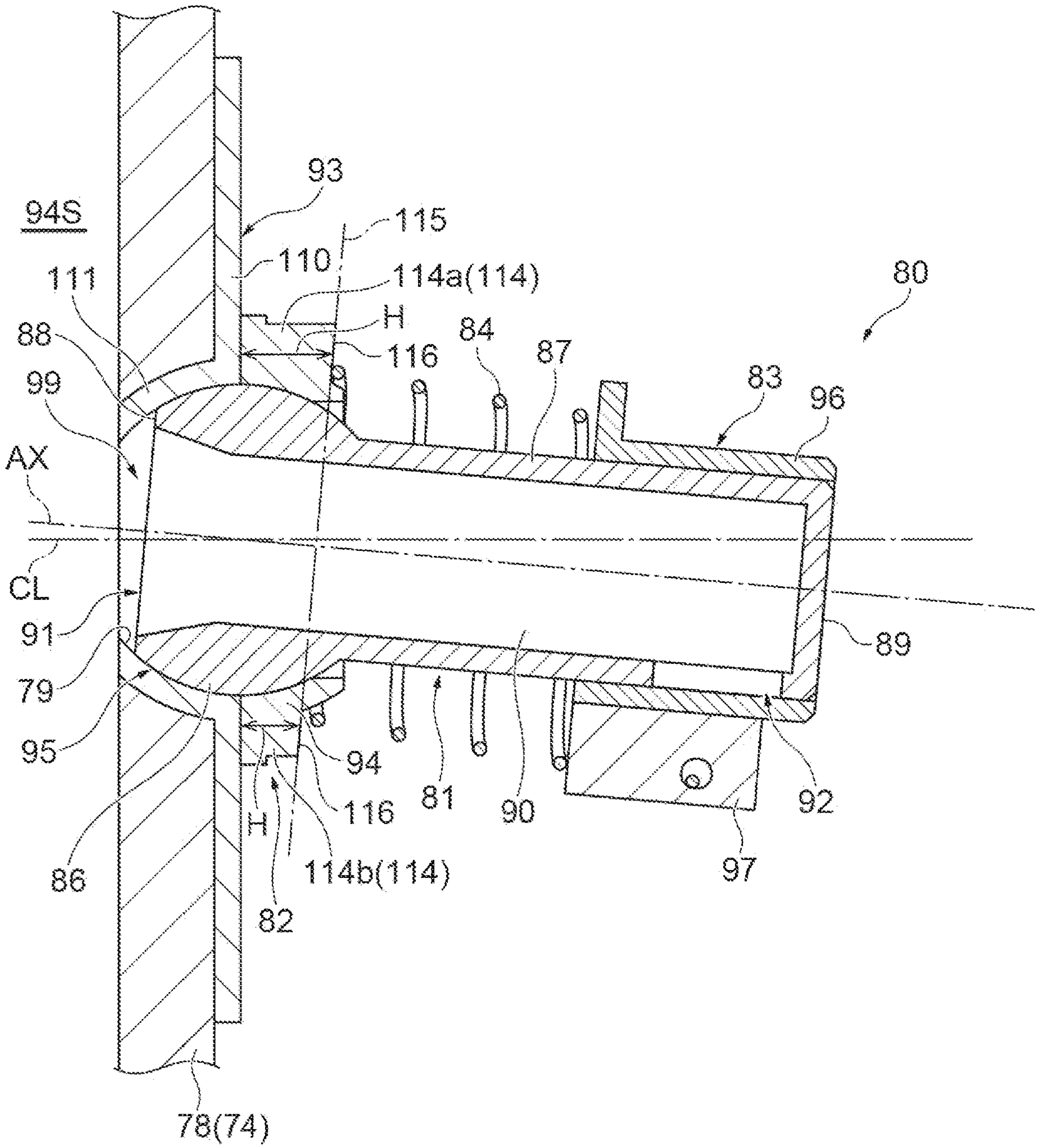
FIG. 6 is a cross-sectional view of the toner conveying device and of a portion of a housing of the cleaning device.
Figure 7:
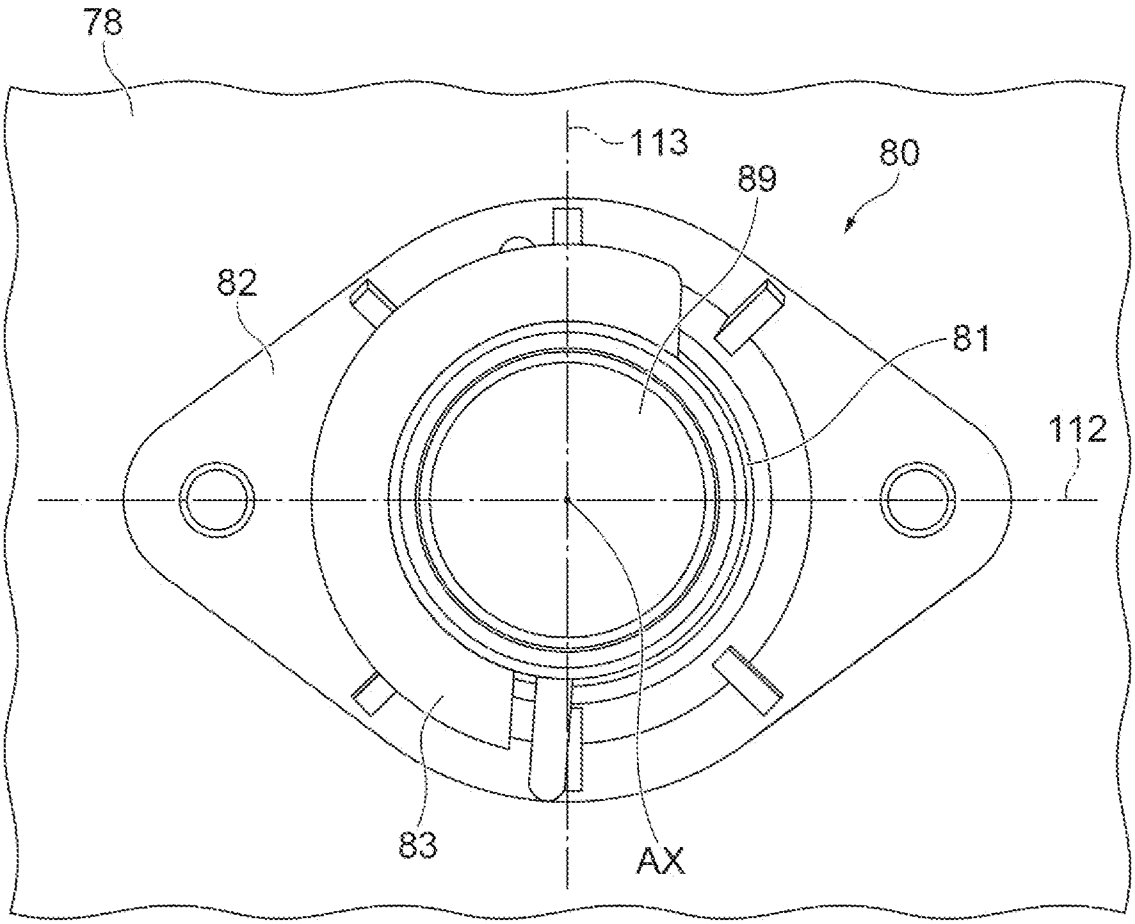
FIG. 7 is a front view of the toner conveying device mounted to the housing of the cleaning device.

With reference to FIGS. 5 to 7, the toner conveying device 80 includes a conveying nozzle 81 and a bracket 82. The conveying nozzle 81 is disposed between the housing 74 and the toner bottle 100 to provide a conveyance path for the toner. The conveying nozzle 81 has a substantially cylindrical shape, and extends between a proximal end 88 and a distal end 89 in a direction along the center axis AX (axial direction). As illustrated in FIG. 6, the conveying nozzle 81 includes a ball end 86 having a substantially spherical outer shape, and a tubular body 87 extending from the ball end 86. The ball end 86 is disposed adjacent to the proximal end 88 of the conveying nozzle 81, and is rotatably supported by the bracket 82. The tubular body 87 has a substantially cylindrical shape, and extends from the ball end 86 along the center axis AX. An end of the tubular body 87 opposite the ball end 86, namely, the distal end 89 is a free end that is not fixed.

The conveying nozzle 81 has an inlet 91 and an outlet 92. The inlet 91 is formed at the proximal end 88 of the conveying nozzle 81 to receive the toner from the housing 74 into the conveying nozzle 81. Namely, the ball end 86 includes the inlet 91. The outlet 92 is formed in the vicinity of the distal end 89 of the conveying nozzle 81 to discharge the toner. For example, the outlet 92 is formed in a circumferential surface of the tubular body 87 at a position adjacent to the distal end 89 of the conveying nozzle 81, and is open downwardly.

A passage 90 extending between the inlet 91 and the outlet 92 along the center axis AX is formed inside the conveying nozzle 81. The toner that is discharged from the housing 74 to be supplied to the inlet 91 of the conveying nozzle 81 is conveyed toward the distal end 89 through the passage 90. The toner conveyed to the distal end 89 is discharged from the outlet 92.

The bracket 82 rotatably supports the ball end 86 of the conveying nozzle 81, and couples the inlet 91 of the conveying nozzle 81 with the opening 79 of the housing 74. With reference to FIGS. 5 and 6, the bracket 82 includes a base portion 93 and a support portion 94. The base portion 93 includes a mounting portion 110 and a fitting portion 111. The mounting portion 110 forms an annular plate shape around a center axis CL, and abuts an outer surface of the wall surface 78 of the housing 74. The center axis CL is a center axis of the bracket 82, and extends in a direction perpendicular to the wall surface 78 of the housing 74. The mounting portion 110 has a through-hole that penetrates through the mounting portion 110 in a thickness direction, and is mounted to the wall surface 78 with a screw inserted into the through-hole. The fitting portion 111 has a cylindrical shape that is reduced in diameter as it extends into the housing 74 away from the mounting portion 110, and extends along an inner surface of the opening 79 of the housing 74.

The support portion 94 protrudes from the base portion 93 in a direction away from the housing 74. The support portion 94 has a cylindrical shape that is reduced in diameter as it extends away from the base portion, and is disposed to surround the ball end 86 of the conveying nozzle 81. The support portion 94 of the bracket 82 and the fitting portion 111 define a socket portion 99 therein that has a substantially spherical space. The socket portion 99 rotatably accommodates the ball end 86 of the conveying nozzle 81. The bracket

82 forms a pivot joint 95 to impart a rotational movement of the conveying nozzle 81, together with the ball end 86 of the conveying nozzle 81.

As described above, since the ball end 86 is rotatably held inside the socket portion 99 having a substantially spherical shape, the conveying nozzle 81 is rotatable around any axis of the pivot joint 95 that is orthogonal to the center axis CL. In other words, the pivot joint 95 imparts a rotational movement of the conveying nozzle 81 around the pivot joint 95, along a plurality of planes that intersect a rotation center of the pivot joint 95, such as planes 112 and 113 (cf. FIG. 7). For example, the conveying nozzle 81 may be rotatable along any plane that is parallel to the center axis CL and that also intersects the rotation center of the pivot joint 95, namely any plane that includes the center axis CL. In such a manner, the conveying nozzle 81 is rotatable around the pivot joint 95 to selectively adjust an angle formed by the center axis AX of the conveying nozzle 81 and the center axis CL of the bracket 82. As a result, the distal end 89 of the conveying nozzle 81 is a free end that can change positions relative to the pivot joint 95.

The example of the toner conveying device 80 further includes a shutter 83 and a spring 84. The shutter 83 may open and close the outlet 92 of the conveying nozzle 81. The shutter 83 is slidable along the center axis AX of the conveying nozzle 81 and is rotatable in a circumferential direction around the conveying nozzle 81, to expose the outlet 92 of the conveying nozzle 81.

The shutter 83 illustrated in FIG. 5 includes a tubular body 96 and a lever arm 97. The tubular body 96 has a substantially cylindrical shape. The tubular body 96 is disposed at a position adjacent to the distal end 89 of the conveying nozzle 81, to radially surround the conveying nozzle 81. An opening 98 is formed in a circumferential surface of the tubular body 96 (cf. FIG. 8C). The outlet 92 of the conveying nozzle 81 and the opening 98 of the tubular body 96 may overlap each other in a radial direction of the conveying nozzle 81 to expose (or open) the outlet 92 of the conveying nozzle 81. On the other hand, the outlet 92 of the conveying nozzle 81 is covered with the circumferential surface of the tubular body 96 to close the outlet 92 of the conveying nozzle 81. In the following description, a position of the shutter 83 to expose the outlet 92 of the conveying nozzle 81 is referred to as an open position, and a position of the shutter 83 to close the outlet 92 of the conveying nozzle 81 is referred to as a closing position. The lever arm 97 has a plate shape, and radially protrudes from the tubular body 96.

Figure 8A:
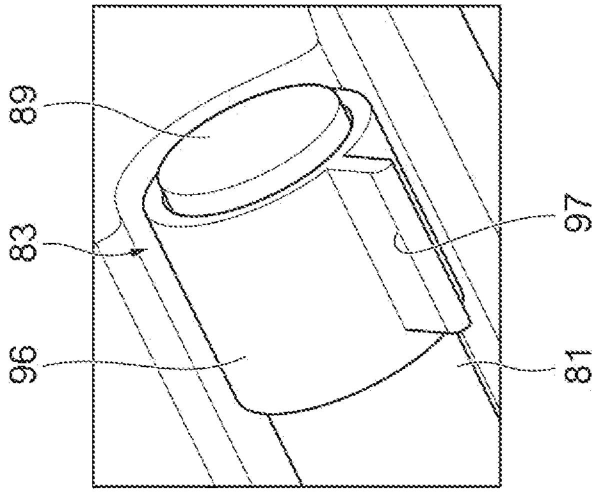
FIG. 8A illustrates a portion of the toner conveying device including a shutter, in which the shutter is shown in a closed position.

The spring 84 is, for example, a coil spring, and is provided around the conveying nozzle 81 in a state where the spring 84 is compressed between the shutter 83 and the bracket 82 in the axial direction and in the circumferential direction of the conveying nozzle 81. A first end of the spring 84 is coupled to the base portion 93 of the bracket 82, and a second end of the spring 84 is coupled to the lever arm 97 of the shutter 83. The spring 84 is connected to the bracket 82 and the shutter 83 to apply a force to bias the shutter 83 in the axial direction of the conveying nozzle 81 and in the circumferential direction around the center axis AX. With reference to FIG. 8A, the shutter 83 may be biased in the axial direction and in the circumferential direction of the conveying nozzle 81 by the spring 84, to the closing position where the shutter 83 covers the outlet 92.

Figure 8B:
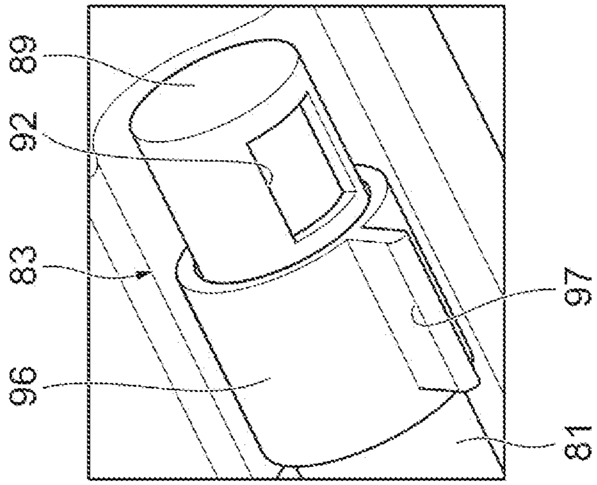
FIG. 8B illustrates the toner conveying device of FIG. 8A, in which the shutter is shown in an open position.

With reference to FIG. 8B, when an external force is applied on the lever arm 97 in the direction parallel to the center axis AX to slide the shutter 83 against a biasing force of the spring 84 in the axial direction of the conveying nozzle 81, the shutter 83 may be moved to a position that is shifted (offset) from the outlet 92 in the axial direction of the conveying nozzle 81. Accordingly, the outlet 92 of the conveying nozzle 81 is exposed.

Figure 8C:
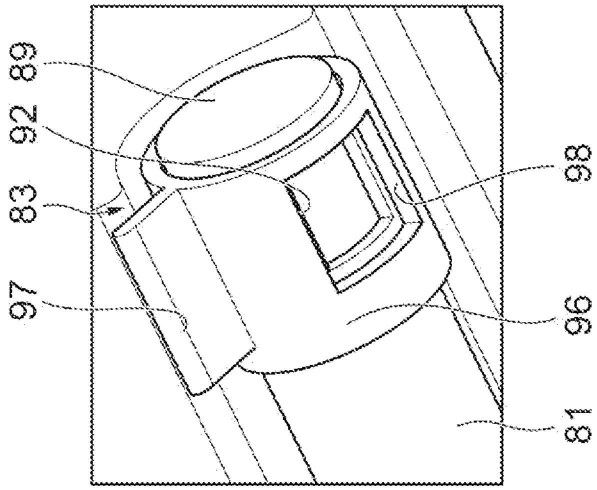
FIG. 8C illustrates the toner conveying device of FIG. 8B, in which the shutter is shown in another open position.

In addition, with reference to FIG. 8C, when an external force is applied on the lever arm 97 in a tangential direction of the tubular body 96 to slide the shutter 83 against the biasing force of the spring 84 in the circumferential direction around the center axis AX, the opening 98 of the shutter 83 may be moved to a position that is aligned with the outlet 92. Accordingly, the opening 98 of the shutter 83 exposes the outlet 92 of the conveying nozzle 81. As described above, the shutter 83 may be slid in the axial direction of the conveying nozzle 81 or may be rotated in the circumferential direction around the center axis AX, to set the shutter 83 in the open position.

In some examples, the example of the bracket 82 may include a plurality of ribs 114 arranged in a circumferential direction around the center axis CL. The plurality of ribs 114 form a part of the support portion 94, and protrude from the base portion 93 away from the housing 74 (e.g., to the outside of the housing 74) in a height direction parallel to the center axis CL, namely, along a direction that is orthogonal to the wall surface 78. Distal ends of the plurality of ribs 114 form a contact surface 116 to contact the spring 84. The contact surface 116 of the plurality of ribs 114 is disposed along a support plane 115, namely a virtual plane, that is angled relative to the wall surface 78 of the housing 74. Accordingly, the plurality of ribs 114 have varying heights H in the height direction.

For example, with reference to FIG. 6, the height H of a first rib 114*a* among the plurality of ribs 114 is set to be greater than the height H of a second rib 114*b* among the plurality of ribs 114. A direction of the center axis CL of the spring 84 is inclined relative to the center axis CL such that a restoring force of the spring 84 between the first rib 114*a* and the shutter 83 is balanced with a restoring force of the spring 84 between the second rib 114*b* and the shutter 83. Accordingly, a momentum to cause the center axis AX of the conveying nozzle 81 to coincide with the center axis of the spring 84 is generated to rotate the conveying nozzle 81 around the pivot joint 95. Namely, the conveying nozzle 81 is urged by the spring 84 so as to orient the center axis AX of the conveying nozzle 81 at an angle, in a non-orthogonal direction relative to the wall surface 78 of the housing 74. As described above, the heights H of the plurality of ribs 114 can be set to adjust the center axis AX of the conveying nozzle 81 to a selected angle. In the example illustrated in FIG. 6, the conveying nozzle 81 is biased by the spring 84 to position the outlet 92 at a position lower than the inlet 91 of the conveying nozzle 81 in a natural (or default) state.

The cleaning device 70 may further include a conveyor 85 (cf. FIG. 4). The conveyor 85 is, for example, a screw conveyor including a spiral blade, that is provided inside the housing 74. The conveyor 85 rotates a screw to convey the untransferred toner collected inside the housing 74, toward the opening 79 of the housing 74. The toner discharged from the opening 79 by the conveyor 85 is conveyed to the toner bottle 100 through the passage 90 of the conveying nozzle 81.

Figure 9A:
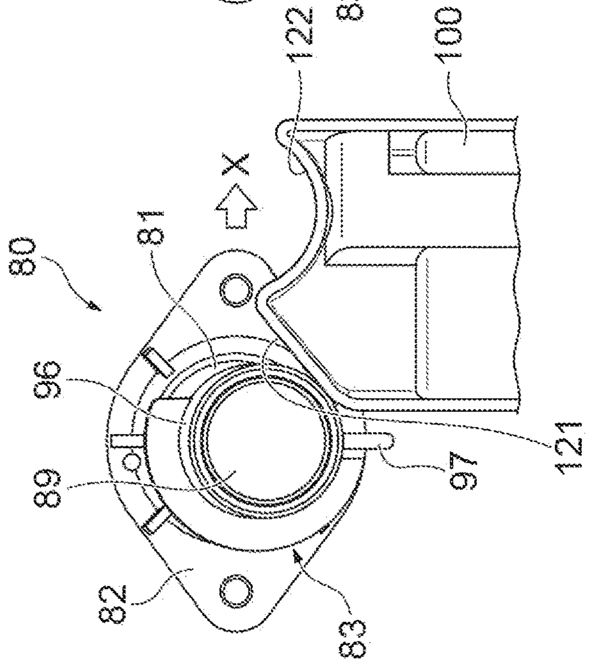
FIG. 9A is a schematic diagram illustrating a first position of a coupling operation of the toner conveying device with an example toner bottle when the cleaning device is installed in a casing of the image forming apparatus.
Figure 9B:
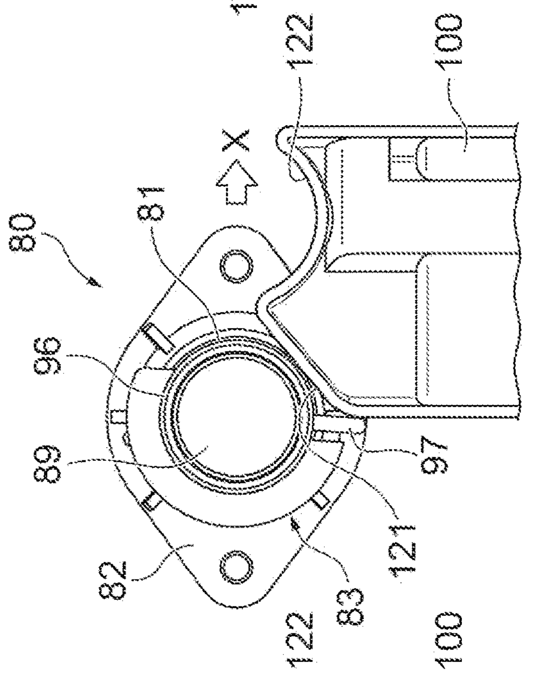
FIG. 9B is a schematic diagram illustrating a second position of the coupling operation.
Figure 9C:
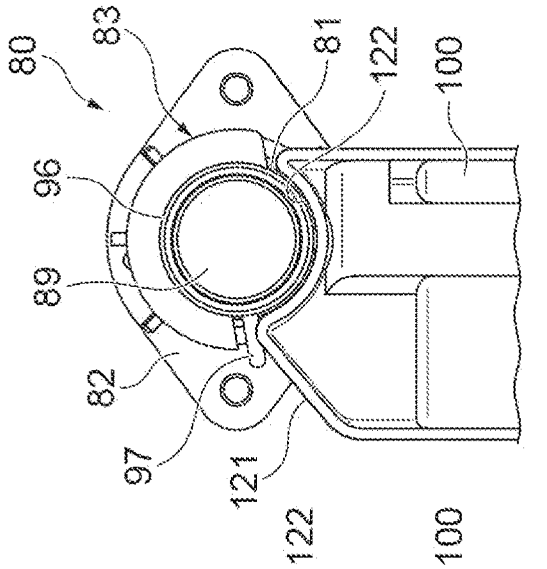
FIG. 9C is a schematic diagram illustrating a third position of the coupling operation.
Figure 10:
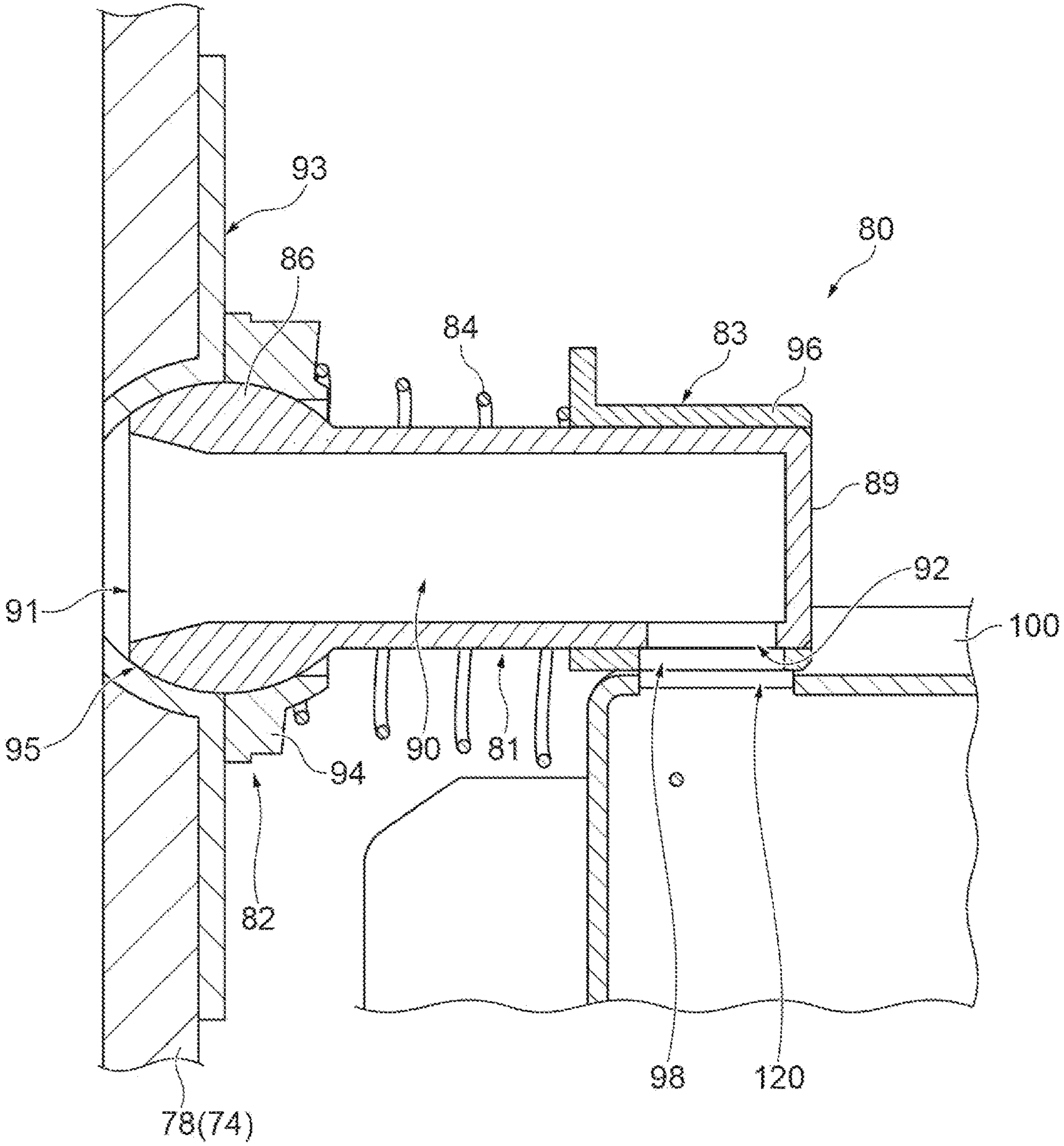
FIG. 10 is a cross-sectional view of the toner conveying device and of another example toner bottle that is coupled to the toner conveying device.

Next, an operation of the toner conveying device 80 will be described with reference to FIGS. 9A to 9C. The cleaning device 70 is extracted from the casing 15 of the image forming apparatus 1 during maintenance of the image forming apparatus 1, and the cleaning device 70 is reinstalled in the casing 15 after maintenance. FIGS. 9A to 9C illustrate a movement of the conveying nozzle 81 and the shutter 83 when the cleaning device 70 is installed in the casing 15 in a state where the toner bottle 100 is set within the casing 15. With reference to FIGS. 9A to 9C, the toner bottle 100 has an inclined surface 121 that is inclined relative to a movement direction of the conveying nozzle 81, and a fitting surface 122 having a concave shape that substantially matches a shape of the conveying nozzle 81. An opening 120 to communicate with an internal space of the toner bottle 100 is formed in the fitting surface 122 of the toner bottle 100 (cf. FIG. 10).

In order to install the cleaning device 70 into the casing 15, with reference to FIG. 9A, the toner conveying device 80 coupled with the cleaning device 70 is slid into the casing 15 in an X direction, together with the cleaning device 70. At this time, the conveying nozzle 81 moves in the X direction in a downwardly inclined state, together with the cleaning device 70, to eventually contact the inclined surface 121 of the toner bottle 100. With reference to FIG. 9B, when the toner conveying device 80 is slid further in a state where the conveying nozzle 81 contacts the inclined surface 121, an upward force is applied from the inclined surface 121 to the tubular body 87 of the conveying nozzle 81 to rotate the conveying nozzle 81 around the pivot joint 95. Namely, an orientation of the conveying nozzle 81 is changed according to a shape of the inclined surface 121.

In addition, the inclined surface 121 contacts the lever arm 97 of the shutter 83 to apply a force to the lever arm 97 in a tangential direction of the tubular body 96. Accordingly, the shutter 83 rotates relative to the center axis AX in the circumferential direction to expose the outlet 92 of the conveying nozzle 81.

With reference to FIG. 9C, when the toner conveying device 80 moves further in the X direction, the distal end 89 of the conveying nozzle 81 is raised over the inclined surface 121 while changing the orientation of the conveying nozzle 81, to fit into the fitting surface 122 of the toner bottle 100. Then, with reference to FIG. 10, the outlet 92 of the conveying nozzle 81, the opening 98 of the shutter 83, and the opening 120 of the toner bottle 100 are aligned in the radial direction of the conveying nozzle 81, so that the housing 74 of the cleaning device 70 and the toner bottle 100 communicate with each other via the passage 90 of the conveying nozzle 81. Accordingly, since the housing 74 and the toner bottle 100 are connected to each other, the toner discharged from the opening 79 of the housing 74 by the conveyor 85 is collected into the toner bottle 100 through the passage 90.

Figure 11C:
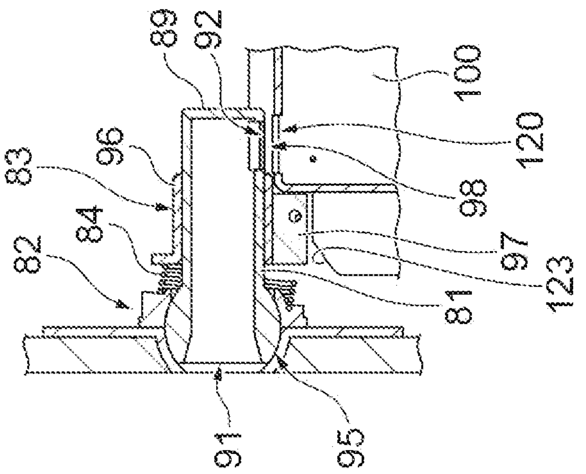
FIG. 11C is a cross-sectional view illustrating a third position of the coupling operation.
Figure 11B:
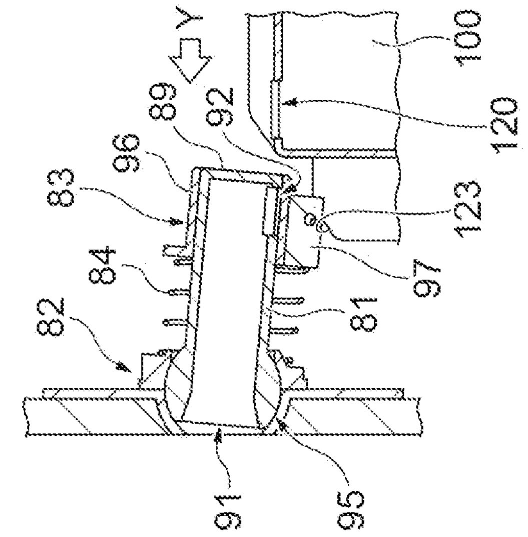
FIG. 11B is a cross-sectional view illustrating a second position of the coupling operation.
Figure 11A:
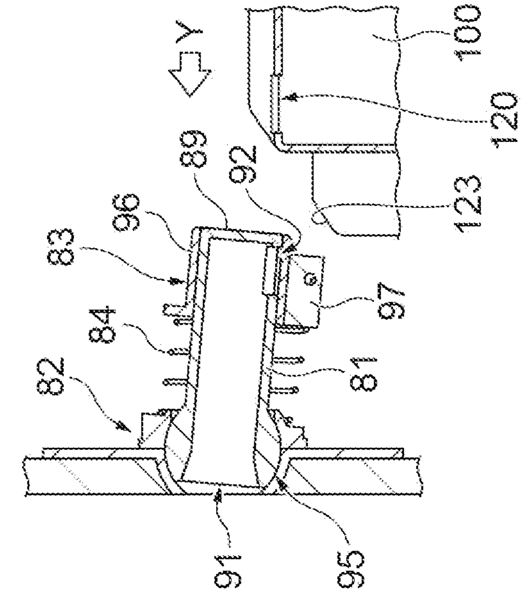
FIG. 11A is a cross-sectional view illustrating a first position of a coupling operation of the toner conveying device with the toner bottle, when the toner bottle is installed into the casing of the image forming apparatus.

Next, reference will be made to FIGS. 11A to 11C. During maintenance of the image forming apparatus 1, the toner bottle 100 that is filled with the toner is extracted from the casing 15, is replaced with an empty toner bottle 100. FIGS. 11A to 11C illustrate movements of the conveying nozzle 81 and the shutter 83 when a toner bottle 100 for the replacement is installed into the casing 15 in a state where the cleaning device 70 and the toner conveying device 80 are installed inside the casing 15. With reference to FIGS. 11A to 11C, the toner bottle 100 has an inclined surface 123 that is inclined relative to a movement direction of the toner bottle 100.

In order to insert the toner bottle 100 into the casing 15, with reference to FIG. 11A, the toner bottle 100 may be slid into the casing 15 of the image forming apparatus 1 in a Y direction. With reference to FIG. 11B, when the toner bottle 100 is moved in the Y direction, the inclined surface 123 of the toner bottle 100 contacts the lever arm 97 of the shutter 83. When the toner bottle 100 is slid further in the Y direction in a state where the lever arm 97 is in contact with the inclined surface 123, an upward force is applied from the inclined surface 123 to the tubular body 87 of the conveying nozzle 81. The conveying nozzle 81 is rotated around the pivot joint 95 by the force to change the orientation of the conveying nozzle 81 according to a shape of the inclined surface 123.

When the toner bottle 100 moves further in the Y direction, the lever arm 97 of the shutter 83 contacts a side wall of the toner bottle 100, so that a force is applied on the lever arm 97 of the shutter 83 to slide the lever arm 97 in the axial direction of the conveying nozzle 81. Accordingly, the shutter 83 may be moved to a position that is shifted (offset) relative to the outlet 92 of the conveying nozzle 81, to expose the outlet 92 of the conveying nozzle 81.

Then, with reference to FIG. 11C, the outlet 92 of the conveying nozzle 81, the opening 98 of the shutter 83, and the opening 120 of the toner bottle 100 are aligned in the radial direction of the conveying nozzle 81, so that the housing 74 of the cleaning device 70 and the toner bottle 100 communicate with each other via the passage 90 of the conveying nozzle 81. Accordingly, since the housing 74 and the toner bottle 100 are connected to each other, the toner discharged from the opening 79 of the housing 74 by the conveyor 85 is collected to the toner bottle 100 through the passage 90.

As described above, the toner bottle 100 may contact the lever arm 97 of the shutter 83 to bias the shutter 83 to the open position where the outlet 92 of the conveying nozzle 81 is exposed, when the opening 120 of the toner bottle 100 is aligned with the outlet 92 of the conveying nozzle 81.

As described above, the conveying nozzle 81 of the toner conveying device 80 is rotatable around the pivot joint 95 along a plurality of planes that intersect the pivot joint 95. Therefore, the orientation of the conveying nozzle 81 can be changed more freely according to a shape of the toner bottle 100 to dispose the outlet 92 of the conveying nozzle 81 at a position where the outlet 92 is aligned with the opening 120 of the toner bottle 100. Accordingly, the example of the toner conveying device 80 provides a connection from the housing 74 to the toner bottle 100.

In addition, the shutter 83 of the toner conveying device 80 is configured to be slidable in the axial direction of the conveying nozzle 81 and to be rotatable in the circumferential direction around the conveying nozzle 81. Namely, the shutter 83 has two types of opening and closing operations. According to the shutter 83, when the cleaning device 70 is installed into the casing 15 in a state where the toner bottle 100 is set inside the casing 15, with reference to FIGS. 9A to 9C, the shutter 83 is rotatable in the circumferential direction via a contact between the toner bottle 100 and the shutter 83, so as to couple the outlet 92 of the conveying nozzle 81 with the opening 120 of the toner bottle 100.

On the other hand, when the toner bottle 100 is installed into the casing 15 in a state where the cleaning device 70 and the toner conveying device 80 are installed inside the casing 15, with reference to FIGS. 11A to 11C, the shutter 83 is slidable in the axial direction of the conveying nozzle 81 via a contact between the toner bottle 100 and the shutter 83, so as to couple the outlet 92 of the conveying nozzle 81 with the opening 120 of the toner bottle 100.

As described above, since the shutter 83 has the two types of opening and closing operations, the cleaning device 70 and the toner bottle 100 can be assembled in any order. As a result, the degree of freedom in a procedure of attaching and detaching the components of the image forming apparatus 1 can be improved, and ease of maintaining the image forming apparatus 1 can be improved.

Figure 12:
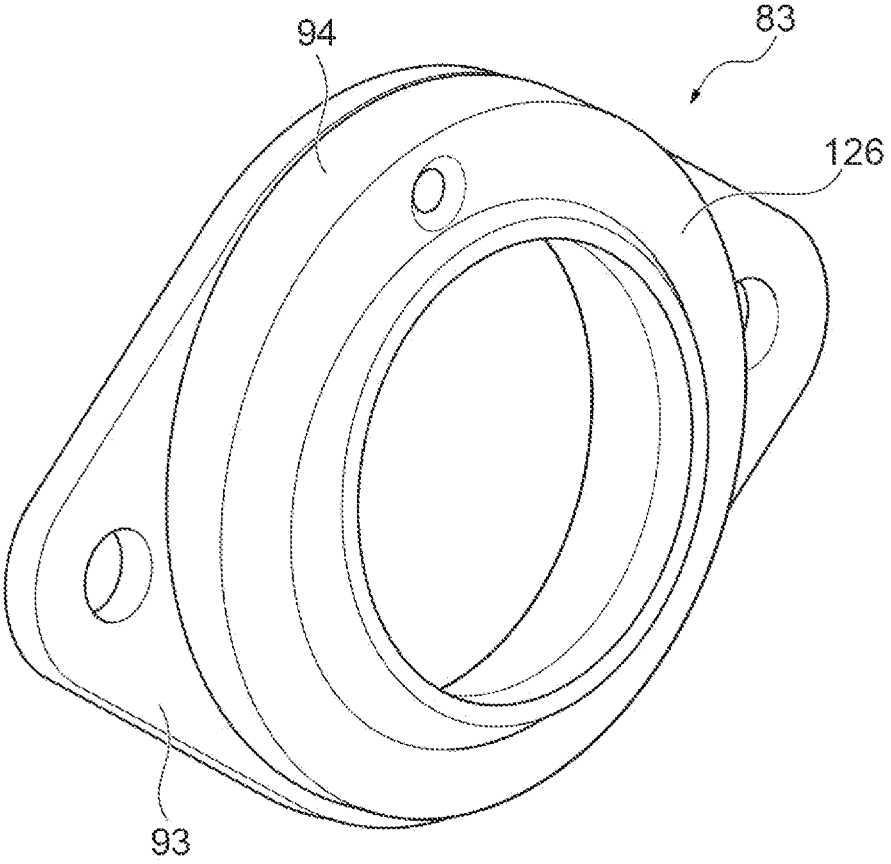
FIG. 12 is a perspective view illustrating an example bracket.

In some examples, with reference to FIG. 5, the plurality of ribs 114 are formed in the bracket 82, and the plurality of ribs 114 have the varying heights H in the height direction (parallel to the center axis CL). In other examples, the bracket 82 may not include the plurality of ribs 114. For example, with reference to FIG. 12, the support portion 94 of the bracket 82 may form a contact surface 126 that is inclined relative to the wall surface 78 of the housing 74. A height of the support portion 94 having the contact surface 126 varies along a circumferential direction of the support portion 94. The spring 84 is held between the contact surface 126 having the variable height in the circumferential direction and the shutter 83, in order to incline the direction of the center axis of the spring 84 relative to the center axis CL, so as to adjust a direction of the center axis AX of the conveying nozzle 81.

With reference to FIGS. 13 to 15B, another example image forming apparatus 150 will be described. Hereinafter, differences from the above-described image forming apparatus 1 will be mainly described, and overlapping description may be omitted.

Figure 13:
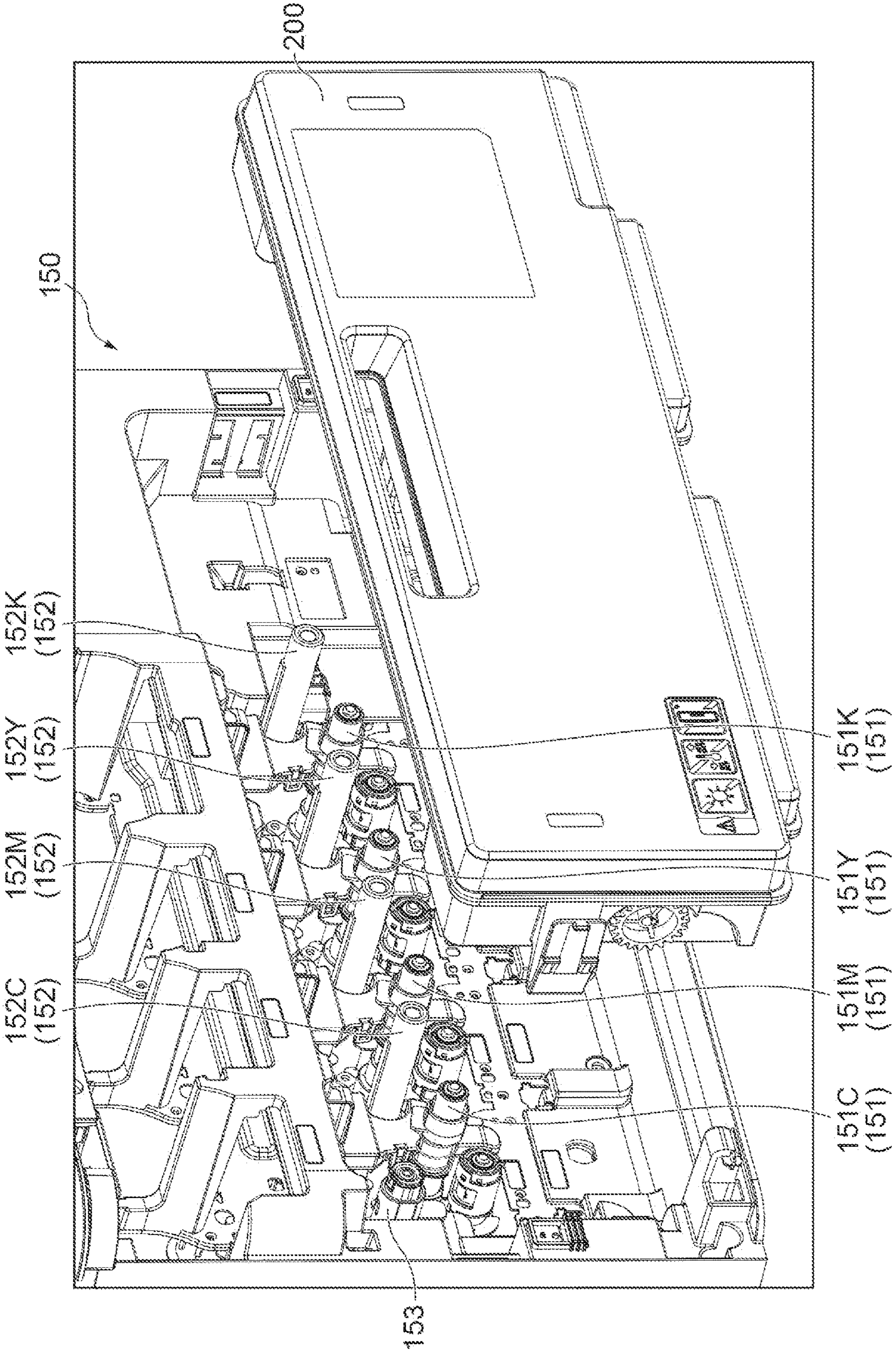
FIG. 13 is a perspective view illustrating an example image forming apparatus.

With reference to FIG. 13, the image forming apparatus 150 includes a plurality of toner conveying devices 151C, 151M, 151Y, and 151K (which may be collectively referred to herein as "toner conveying devices 151") that are connected to the plurality of developing devices 20C, 20M, 20Y, and 20K, respectively. Additionally, the image forming apparatus 150 includes a plurality of toner conveying devices 152C, 152M, 152Y, and 152K that are connected to the plurality of photoconductors 40C, 40M, 40Y, and 40K, respectively. The toner conveying devices 152C, 152M, 152Y, and 152K have a similar configuration, and any one thereof may be referred to herein as a "toner conveying device 152". Further, the plurality of toner conveying devices 152C, 152M, 152Y, and 152K may be collectively referred to herein as "toner conveying devices 152". Additionally, the image forming apparatus 150 includes a toner conveying device 153 connected to the housing 74 of the cleaning device 70.

The toner conveying devices 151, 152, and 153 communicate with respective chambers to collect waste toner generated in the developing devices 20C, 20M, 20Y, and 20K, in the photoconductors 40C, 40M, 40Y, and 40K, and in the cleaning device 70, and to convey the waste toner collected from the chambers to a toner bottle 200. Similarly to the toner conveying device 80 described above, each of the toner conveying devices 151, 152, and 153, includes therein a conveying nozzle that is rotatable around a pivot joint along a plurality of planes that intersect the pivot joint.

Figure 14:
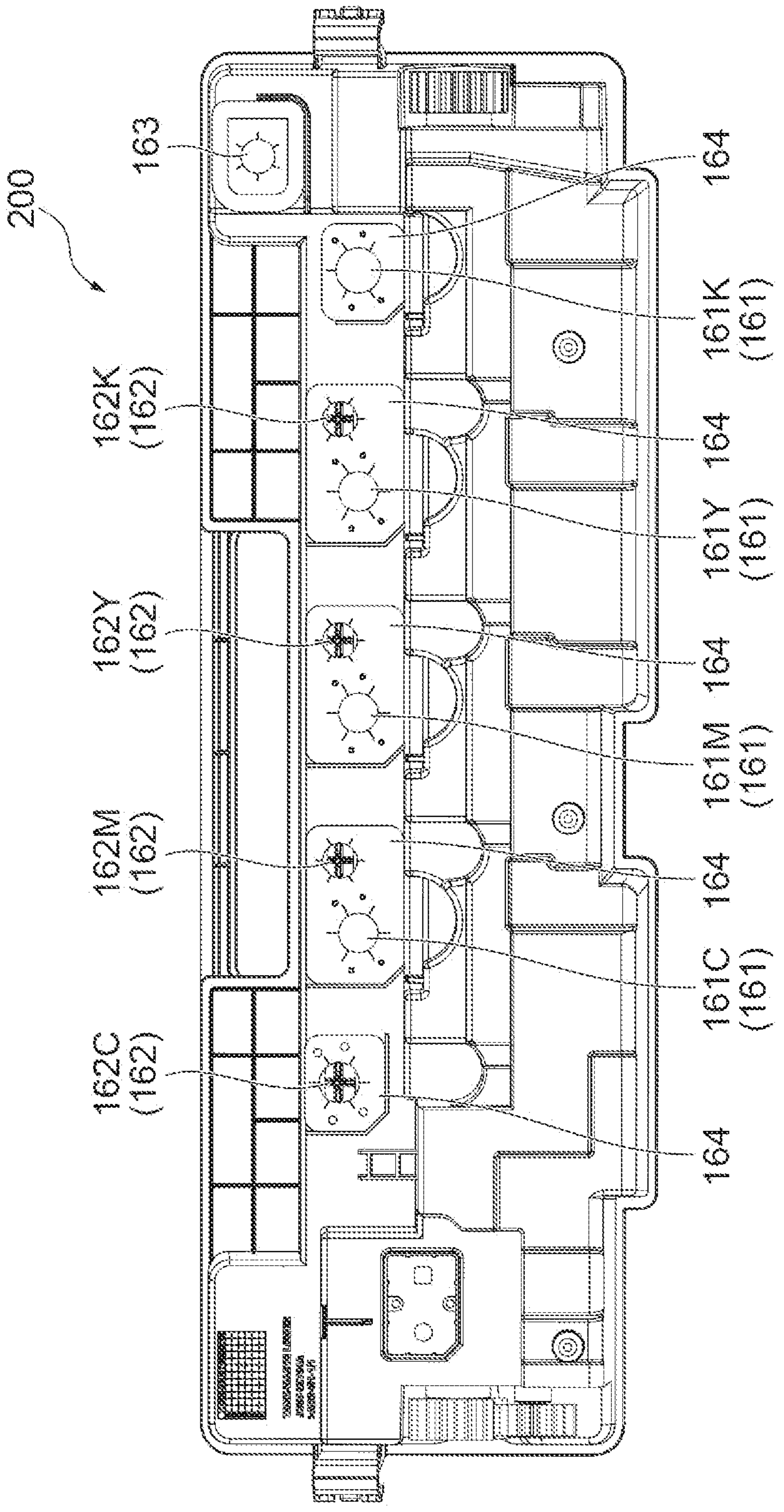
FIG. 14 is a front view of an example toner bottle.

With reference to FIG. 14, the toner bottle 200 is a container to collect waste toner generated in the plurality of developing devices 20C, 20M, 20Y, and 20K, the plurality of photoconductors 40C, 40M, 40Y, and 40K, and the cleaning device 70, and include a plurality of openings 161C, 161M, 161Y, and 161K (which may be collectively referred to herein as "openings 161"), a plurality of openings 162C, 162M, 162Y, and 162K (which may be collectively referred to herein as "openings 162"), and an opening 163. Each of the openings of the toner bottle 200 is surrounded by a seal member 164.

In order to convey the waste toner generated in the developing devices 20C, 20M, 20Y, and 20K, the photoconductors 40C, 40M, 40Y, and 40K, and the cleaning device 70, to the toner bottle 200, the conveying nozzles of the toner conveying devices 151C, 151M, 151Y, and 151K are inserted into the openings 161C, 161M, 161Y, and 161K, respectively, the conveying nozzles of the toner conveying devices 152C, 152M, 152Y, and 152K are inserted into the openings 162C, 162M, 162Y, and 162K, respectively, and the conveying nozzle of the toner conveying device 153 is inserted into the opening 163.

Figure 15A:
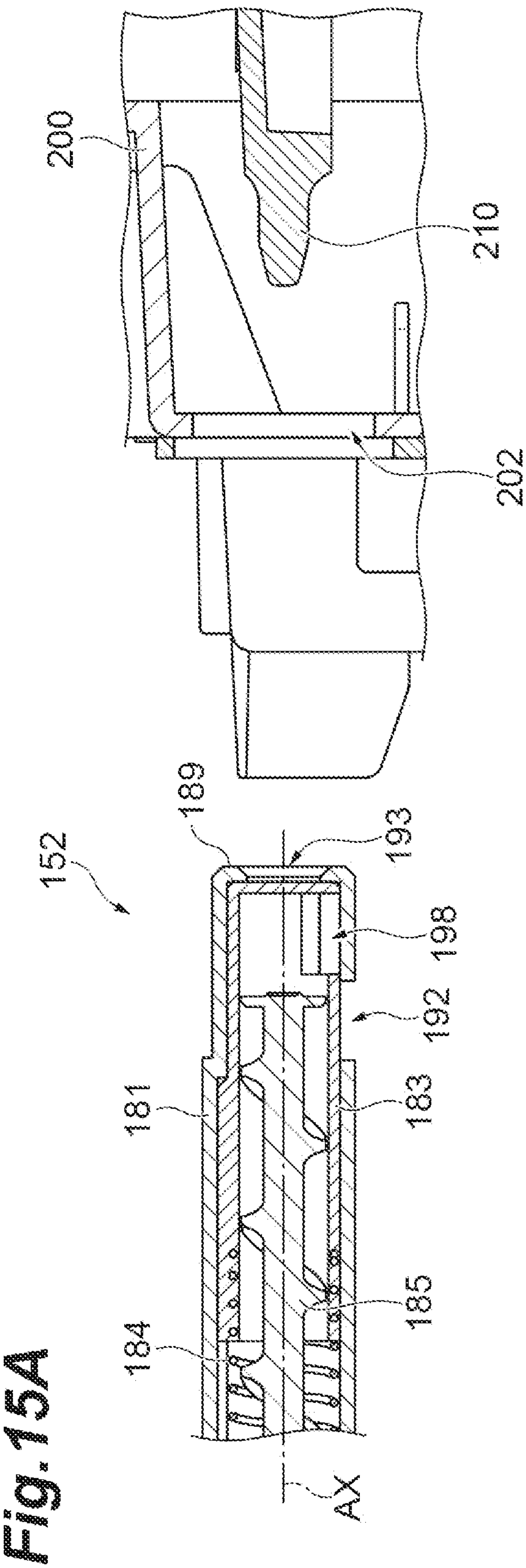
FIG. 15A is a first cross sectional view illustrating a procedure of connecting a toner conveying device and a toner bottle.
Figure 15B:
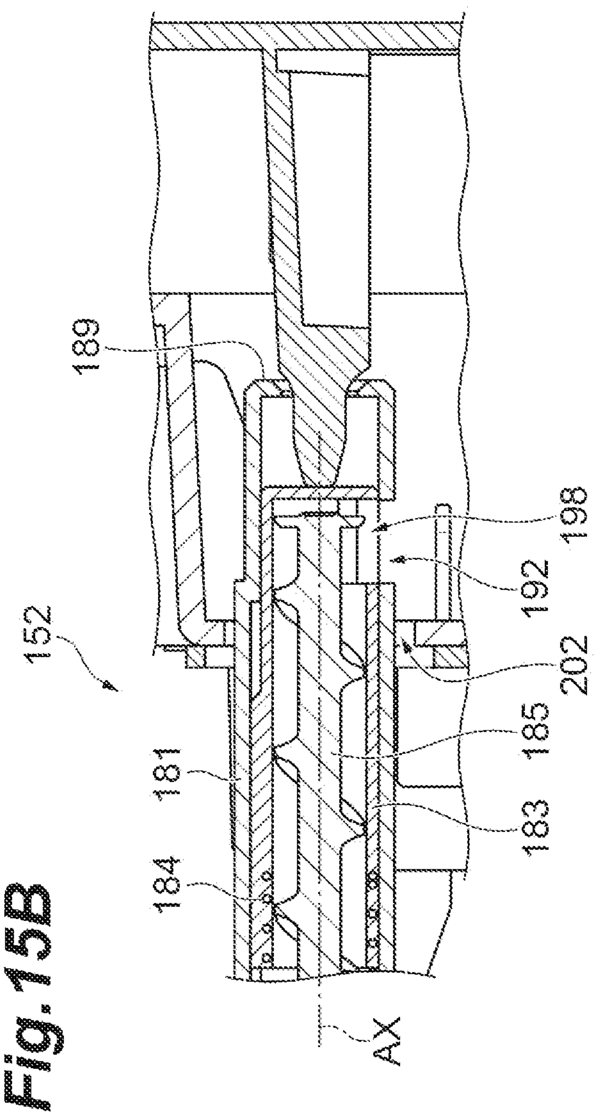
FIG. 15B is a second cross sectional view illustrating a procedure of connecting a toner conveying device and a toner bottle.

FIGS. 15A and 15B illustrate the example toner conveying device 152. With reference to FIG. 15A, the toner conveying device 152 includes a conveying nozzle 181 and a shutter 183. The conveying nozzle 181 is coupled with the photoconductor 40 by a bracket. The conveying nozzle 181 has an inlet that communicates with a chamber of the photoconductor 40 to receive waste toner from the chamber, and an outlet 192 to discharge the waste toner. A distal end 189 of the conveying nozzle 181 forms an opening 193.

The shutter 183 has a substantially cylindrical shape, and is disposed within the conveying nozzle 181. The shutter 183 is slidable along the center axis AX inside the conveying nozzle 181. An opening 198 is formed in a circumferential surface of the shutter 183. A spring 184 is provided between the bracket and the shutter 183 of the toner conveying device 152. The spring 184 imparts a restoring force to the shutter 183 toward the distal end 189 of the conveying nozzle 181 to bias the shutter 183 to a closing position where the shutter 183 covers the outlet 192 of the conveying nozzle 181.

A conveyor 185 is provided inside the shutter 183. The conveyor 185 is, for example, a screw conveyor including a spiral blade, and extends along the center axis AX inside the conveying nozzle 181.

With reference to FIG. 15B, when the conveying nozzle 181 of the toner conveying device 152 is inserted into an opening 202 of the toner bottle 200, a protrusion 210 that protrudes toward the opening 202 in the toner bottle 200 is inserted into the opening 193 of the conveying nozzle 181 to press the shutter 183 toward a proximal end of the conveying nozzle 181. Accordingly, the shutter 183 slides along the center axis (or axial direction) AX to retract toward the proximal end, and the outlet 192 of the conveying nozzle 181 and the opening 198 of the shutter 183 are aligned with each other in the axial direction of the conveying nozzle 181 to expose (or open) the outlet 192. Then, the conveyor 185 is driven to convey the waste toner in the conveying nozzle 181 toward the outlet 192, and to supply the waste toner from the outlet 192 into the toner bottle 200.

As described above, since the conveying nozzles of the toner conveying devices 151, 152, and 153 are rotatable around the pivot joints along the plurality of planes that intersect the pivot joints, the orientation of the conveying nozzles can be changed according to a shape of the toner bottle 200. Therefore, the conveying nozzles of the toner conveying devices 151, 152, and 153 can be more easily aligned with and inserted into the respective openings 161, 162, and 163 of the toner bottle 200.

It should be appreciated that although various examples have been described and illustrated in the specification, the arrangements and details can also be changed in other examples.

For example, although the examples of the toner conveying devices 80, 151, 152, and 153 convey waste toner to the toner bottles 100 or 200, another example toner conveying device may convey unused (or fresh) toner. For example, one of the above-described toner conveying devices may be disposed between the toner tank 18 and the corresponding developing device 20 to convey unused toner stored in the toner tank 18, to the developing device 20.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. An image forming apparatus comprising:
a housing to accommodate toner;
a conveying nozzle having an inlet to receive the toner from the housing, and an outlet to discharge the toner; and
a bracket to couple the inlet of the conveying nozzle with an opening of the housing, wherein the bracket forms a pivot joint disposed adjacent to the inlet to impart a rotational movement of the conveying nozzle around the pivot joint,
wherein the conveying nozzle includes a ball end including the inlet, wherein the ball end has a substantially spherical shape, and
wherein the pivot joint includes a socket formed by the bracket to rotatably accommodate the ball end of the conveying nozzle.

2. The image forming apparatus according to claim 1,
wherein the conveying nozzle has a cylindrical shape,
wherein the image forming apparatus comprises a shutter to cover the outlet of the conveying nozzle, and
wherein the shutter is slidable in an axial direction of the conveying nozzle and is rotatable in a circumferential direction around the conveying nozzle, to expose the outlet of the conveying nozzle.

3. The image forming apparatus according to claim 2, comprising:
a spring disposed between the shutter and the bracket to bias the shutter in the axial direction and in the circumferential direction of the conveying nozzle, to a closing position where the shutter covers the outlet.

4. The image forming apparatus according to claim 3,
wherein the shutter includes a tubular body that surrounds the conveying nozzle, and a lever arm that protrudes radially from the tubular body to rotate the shutter around the conveying nozzle in response to a force applied on the lever arm in a tangential direction of the tubular body, and to slide the shutter in the axial direction of the conveying nozzle in response to a force applied on the lever arm in a direction parallel to the axial direction.

5. The image forming apparatus according to claim 4, comprising:
a toner bottle having an opening, wherein the toner bottle contacts the lever arm to bias the shutter to an open position that exposes the outlet of the conveying nozzle, when the opening of the toner bottle is aligned with the outlet of the conveying nozzle to receive the toner from the conveying nozzle.

6. The image forming apparatus according to claim 3,
wherein the bracket includes a base portion mounted on a wall surface of the housing, and a support portion that forms a contact surface to contact the spring,
wherein the contact surface is disposed along a support plane that is angled relative to the wall surface of the housing, to orient a center axis of the spring in a non-orthogonal direction relative to the wall surface, and
wherein the spring is coupled to the shutter to bias a distal end of the conveying nozzle opposite the pivot joint, according to the non-orthogonal direction of the spring.

7. The image forming apparatus according to claim 6,
wherein the support portion includes a plurality of ribs arranged in the circumferential direction to form the contact surface,
wherein the plurality of ribs extend from the base portion in a height direction that is orthogonal to the wall surface of the housing, and
wherein the plurality of ribs have varying heights in the height direction according to the support plane, to orient the center axis of the spring in the non-orthogonal direction.

8. The image forming apparatus according to claim 6,
wherein the outlet is disposed adjacent to the distal end of the conveying nozzle, and
wherein the spring biases the conveying nozzle to position the outlet at a lower position than the inlet of the conveying nozzle.

9. The image forming apparatus according to claim 1, comprising:
an intermediate transfer belt; and
a cleaning device to collect the toner from the intermediate transfer belt, wherein the cleaning device includes:
the housing to accommodate the toner collected from the intermediate transfer belt; and
a conveyor disposed inside the housing to convey the toner collected toward the opening of the housing.

10. A toner conveying device comprising:
a conveying nozzle having an inlet to receive toner from a housing, and an outlet to discharge the toner; and
a bracket to couple the inlet of the conveying nozzle with an opening of the housing, wherein the bracket forms a pivot joint located adjacent to the inlet to impart a rotational movement of the conveying nozzle around the pivot joint,
wherein the conveying nozzle includes a ball end including the inlet, wherein the ball end has a substantially spherical shape, and
wherein the pivot joint includes a socket formed by the bracket to rotatably accommodate the ball end of the conveying nozzle.

11. The toner conveying device according to claim 10,
wherein the pivot joint is coupled to the conveying nozzle to impart the rotational movement of the conveying nozzle along a plurality of planes that intersect the pivot joint.

12. The toner conveying device according to claim 11,
wherein the conveying nozzle includes a tubular body extending from the ball end, and wherein the outlet is formed in a circumferential surface of the tubular body at a position adjacent to a distal end of the conveying nozzle opposite the ball end,
wherein the toner conveying device comprises a shutter having a tubular shape to cover the outlet of the conveying nozzle, and
wherein the shutter is slidable relative to the tubular body of the conveying nozzle in an axial direction and is rotatable in a circumferential direction of the conveying nozzle, so as to expose the outlet of the conveying nozzle when the shutter is offset from the outlet the axial direction and when an opening of the shutter is aligned with the outlet in the circumferential direction.

13. The toner conveying device according to claim 12, comprising:
a spring that is coupled between the shutter and the bracket to bias the shutter in the axial direction and in the circumferential direction of the conveying nozzle, to a closing position where the shutter covers the outlet, wherein the shutter includes a tubular body that surrounds the conveying nozzle, and a lever arm that protrudes radially from the tubular body, to rotate the shutter around the conveying nozzle in response to a force applied on the lever arm in a tangential direction of the tubular body, and to slide the shutter in the axial direction of the conveying nozzle in response to a force applied on the lever arm in a direction parallel to the axial direction.

* * * * *